United States Patent
Shin et al.

(10) Patent No.: US 7,001,544 B2
(45) Date of Patent: Feb. 21, 2006

(54) METHOD FOR MANUFACTURING CARBON-CARBON COMPOSITES

(75) Inventors: Hyun Kyu Shin, Kyungnam (KR); Jong Hyun Park, Kyungnam (KR); Sang Hyo Park, Kyungnam (KR); Hong Sik Park, Kyungnam (KR); Woo Chul Choi, Kyungnam (KR); Kwang Soo Kim, Kyungnam (KR)

(73) Assignee: DACC Co., Ltd., Kyungnam (KR)

( * ) Notice: Subject to any disclaimer, the term of this patent is extended or adjusted under 35 U.S.C. 154(b) by 334 days.

(21) Appl. No.: 10/180,778

(22) Filed: Jun. 25, 2002

(65) Prior Publication Data

US 2003/0214064 A1    Nov. 20, 2003

(30) Foreign Application Priority Data

May 20, 2002    (KR) .............................. 2002-27788

(51) Int. Cl.
*B29C 67/00*    (2006.01)
*C23C 16/26*    (2006.01)

(52) U.S. Cl. ........... 264/29.2; 264/29.7; 264/81; 264/102; 264/255; 264/258; 264/510; 264/511; 264/324; 156/93

(58) Field of Classification Search ........ 264/257–258, 264/510–512, 101–102, 324, 29.1–29.7, 264/81, 255; 156/93
See application file for complete search history.

(56) References Cited

U.S. PATENT DOCUMENTS

| | | | | |
|---|---|---|---|---|
| 5,348,774 A | * | 9/1994 | Golecki et al. | 427/543 |
| 5,552,008 A | * | 9/1996 | Hecht et al. | 156/174 |
| 5,686,117 A | * | 11/1997 | Snyder et al. | 425/112 |
| 5,948,330 A | * | 9/1999 | Rivers et al. | 264/29.5 |
| 6,051,167 A | * | 4/2000 | Withers et al. | 264/29.2 |
| 6,132,877 A | * | 10/2000 | Winckler et al. | 428/408 |
| 6,255,234 B1 | * | 7/2001 | Erdemir et al. | 442/97 |
| 6,361,722 B1 | * | 3/2002 | Theys et al. | 264/29.2 |
| 6,401,941 B1 | * | 6/2002 | Maumus | 211/59.1 |
| 6,737,120 B1 | * | 5/2004 | Golecki | 427/421 |

* cited by examiner

*Primary Examiner*—Stefan Staicovici
(74) *Attorney, Agent, or Firm*—Fish & Richardson P.C.

(57) ABSTRACT

A method for manufacturing carbon-carbon composites includes steps of producing a mat using carbon fiber, carbon fabric, carbon sheet, or staple fiber; laminating at least three layers of mats; producing a preform using the laminated mats with a needle punching method; performing a first thermal treatment process on the produced preform at a predetermined temperature; densifying the first-thermal-treated preform; performing a second thermal treatment process on the densified preform; forming a predetermined shape out of the second-thermal-treated preform; and performing an oxidation resistant treatment process of the shaped preform.

10 Claims, 4 Drawing Sheets

METHOD FOR MANUFACTURING CARBON-CARBON COMPOSITES

CROSS REFERENCE TO RELATED APPLICATIONS

Pursuant to 35 USC § 119, this application claims the benefit of Korean Patent Application No. 10-2002-0027788 filed May 20, 2002.

BACKGROUND OF THE INVENTION

1. Field of the Invention

The present invention relates to a method for manufacturing carbon-carbon composites, and more particularly, to a method for manufacturing carbon-carbon composites, in which the densification process has been improved, to reduce manufacturing time and costs while maintaining good high-temperature properties of the finished product (e.g., brake disks) such as frictional coefficient, abrasion, thermal conductivity, thermal expansion coefficient, density, specific heat, compression and shear strength, and oxidation resistance.

2. Discussion of the Related Art

In general, a carbon-carbon composite is an essential material in a variety of high-technology applications requiring durability at very high temperatures. Research and development of its manufacture and application technologies have progressed since the end of the 1960's. Since the 1970's, carbon-carbon composites have been used in the disk brakes of jet fighters, large passenger airliners, and other aircraft due to their excellent resistance to friction, abrasion, and thermal shock. Additional applications include and the disk brakes of land transportation means such as tanks, special vehicles, rapid transit trains, and racing cars, high-temperature structures such as gas turbine blades and jet-engine parts, the rocket nozzles of launch vehicles, the re-entry surfaces of the space shuttle, the walls of fusion reactors, and electrodes and other high-temperature industrial equipment.

Thus far, improvements to the method of manufacturing carbon-carbon composite materials has focused on the production of materials having improved properties, rather than striving for reducing production cost or shortening the process time. Accordingly, production costs have remained very high, with huge investments required for manufacturing facilities.

More recently, however, the importance of cost reduction and process simplification has drawn attention. Cost reduction research has been generally achieved through one of two means: through a cost reduction in carbon fiber, which accounts for the majority of the raw material for manufacturing carbon-carbon composites, and through process simplification.

Carbon-carbon composites generally comprise carbon fiber filler and carbon matrix. The carbon fiber filler is poly-acrylonytrile-based fiber (or PAN-based fiber), pitch-based fiber, or rayon-based fiber. The carbon matrix is pitch, phenolic resin, furan resin, or pyrolytic carbon using a CVD method.

The method of manufacturing carbon-carbon composites can be basically divided into a process of producing a preform using a carbon-based fiber or fabric as the carbon fiber filler, and a process of densifying the preform to meet application criteria. The method also includes a high-temperature thermal treatment process, which is performed on the preform before densification, a high-temperature thermal treatment process after densification, and an oxidation resistant treatment to impart durability on the finished product.

Initially, the densification process used a resin char, but poor physical properties of the thus-manufactured product led to chemical vapor infiltration technology, which is widely used now. Such infiltration of carbon, however, requires a time-consuming process. Another technology, one using pitch, is also drawing attention. Rather than employing one or the other method, however, multiple processes can be combined for manufacturing the product. These technologies have been applied to real products, and the techniques used are selected based on the desired application of the ultimately produced material.

The carbon-carbon composite material produced by combining multiple processes is lightweight and exhibits good properties in terms of hot strength, specific strength, heat resistant impact, chemical resistance, and biocompatibility. The end product is applicable to environments higher than 3000° C. in an inactive atmosphere, such as the brake disks of aircraft, rapid transit trains, and other large high-speed vehicles. In manufacturing carbon brake disks for aircraft, chemical vapor infiltration is primarily used. As an alternative, a combined technology of phenolic infiltration/carbonization and chemical vapor infiltration is used.

Conventional technologies are applied when manufacturing the carbon-carbon composites by producing a two-dimensional preform laminated in a regular form using carbon fiber or carbon fabric, performing densification through a liquid impregnation process using pitch, phenol, etc., and performing thermal treatment at a specified temperature, while a three-dimensional preform is woven in the x-, y-, and z-axes using oxi-PAN fiber or PAN fiber, followed by a densification process or a chemical vapor infiltration process. The performance and physical properties of a carbon-carbon brake disk can be determined according to the processes employed. Especially, the performance of carbon-carbon composite brake produced by the chemical vapor infiltration has been highly rated.

The manufacture of two-dimensional preforms, however, is disadvantageous in that the manufacturing process requires a long lead-time and the strength is low. Meanwhile, there are as yet no successful manufacturing methods for three-dimensional preforms, though it is known that the final product is affected by fiber component ratio (reinforced along the three axes), weaving direction, and carbon fiber volume ratio.

Several publications relate to the above subject matter.

According to U.S. Pat. No. 5,688,577 (W. Novis Smith, et al.), carbon-carbon composites can be manufactured by producing a preform using a needle process after forming several layers laminated with UD fiber at 22.5°, 45.0°, 67.5°, and 90° from the x-axis, to produce a three-dimensional preform using non-asbestos based materials, and thereafter performing a densification process on the preform using chemical vapor infiltration, resin impregnation, etc.

According to U.S. Pat. No. 5,952,075 (Steven Clark, et al.), a preform can be manufactured by using a needle process after laminating with a specified thickness using fabric (plain or satin weave).

According to U.S. Pat. No. 6,077,464 (Neil Murdie, et al.), a preform can be produced with the use of Mesophase pitch, thereby producing carbon-carbon composites by performing densification through a CVD, HIP, PIC, or VPI process, or by a combination thereof.

According to U.S. Pat. No. 6,180,223 (Ronald Fisher, et al.), carbon-carbon composites can be produced by performing a densification process with chemical vapor infiltration using a preform including a susceptor foil, wherein the process is performed using hydrocarbon gas. The portion including the susceptor foil is processed by high density condition than other portion has a comparatively high thermal conductivity, thereby having higher strength than other parts, so that a part bearing the load can be improved effectively.

Korean Patent No. 1999-0061153 (Ik-hyun O H, et al.) is related to a method of manufacturing carbon-carbon composite materials by producing an intermediate molding body of carbon-carbon composites and performing impregnation/carbonization on pitch several times. Thus, a preform can be produced with an intermediate molding body. The method comprises steps of producing oxi-PAN fiber for producing oxi-PAN mats and then stitching the oxi-PAN mats.

According to Korean Patent No. 2000-0064393 (Hubbard David Andrew, et al.), a friction-interlocking device comprises a carbon-ceramic composite including carbon fiber network and a filler including silicone carbide. The carbon-ceramic composite has the structure including 35–50 wt % of carbon fiber, 14–30 wt % of free carbon, 10–28 wt % of silicone carbide, 5–14 wt % of silicone, and 5–14 wt % of silicone oxide.

Korean Patent 1999-0000133 is related to carbon-carbon composites for friction materials, such as those used for the brake disk of rapid transit trains and automobiles. Here, a method for manufacturing carbon-carbon composites comprises steps of producing a molding body by alternately laminating carbon fiber with a mixture of carbon fiber, pitch powder, and graphite powder, producing a green body by placing the molding body into a molding machine for heating and compressing, performing a first carbonization on the green body, performing a second carbonization several times by impregnating pitch on the first-carbonated material, and performing chemical vapor infiltration on the carbonated material with hydrocarbon.

When manufacturing a carbon-carbon composite brake disk using the above-mentioned processes, the manufacturing process is overly time-consuming and failure rates are high. In addition, it is difficult to meet product requirements in frictional coefficient, abrasion, thermal conductivity, thermal expansion coefficient, density, specific heat, compression and shear strength, and oxidation resistance, which are typically required of a brake disk used in the various applications as mentioned above.

SUMMARY OF THE INVENTION

The present invention has been contrived to resolve the problems as described above.

It is an object of the present invention to provide a method for manufacturing carbon-carbon composites, in which the produced material attains the required properties of a brake disk.

It is another object of the present invention to provide a method for manufacturing carbon-carbon composites, in which the overall process time is reduced by performing a densification process using a thermal gradient chemical vapor infiltration process.

Therefore, in order to achieve the above and other objects of the present invention, there is provided a method for manufacturing carbon-carbon composites, comprising steps of: producing a mat selected from the group consisting of carbon fiber, carbon fabric, carbon sheet and staple fiber; laminating at least three layers of the mats; producing a preform using the laminated mats with a needle punching method; performing a first thermal treatment process on the produced preform at a predetermined temperature; densifying the first-thermal-treated preform; performing a second thermal treatment process on the densified preform; forming a predetermined shape out of the second-thermal-treated preform; and performing an oxidation resistant treatment process of the shaped preform.

Preferably, the predetermined temperature of the first thermal treatment process is 700~2000° C., and the densification process is performed with a thermal gradient chemical vapor infiltration process. As a result of the densification process, the density is increased to 1.60~1.90 g/cc. The densification process can be also performed with a liquid impregnation process using pitch, phenol, etc., or using the chemical vapor infiltration and liquid impregnation processes simultaneously.

Any one of oxi-PAN-based fiber, PAN-based fiber, rayon-based fiber, and pitch-based fiber may be used for the carbon fiber. The carbon fiber volume ratio of the oxidation-resistant-treated preform is 10~40%, the thickness is 0.1~2.0 mm, and the length of carbon fiber reinforced with the z-axis is 1~10 mm.

The mat lamination is performed with semi-isotropy at 0°/−60°/+60°, and when producing the preform with oxi-PAN or carbon sheet, thermal treatment is performed within the range of 700~2000° C., and a final process is performed within the range of 1500~2800° C.

Preferably, for the oxidation resistant treatment thermal treatment is performed within the range of 200~1200° C. after a coating treatment using the chemical composition with B, BN, $H_3PO_4$, $Mn(H_3PO_4)_2 2H_2O$, KOH, $SiO_2$, and $NH_3$.

BRIEF DESCRIPTION OF THE DRAWINGS

The application of the preferred embodiments of the present invention is best understood with reference to the accompanying drawings, in which like reference numerals are used for like and corresponding parts, wherein:

FIGS. 3A and 3B are perspective views of a preform produced according to the invention, wherein FIG. 3A shows the individually laminated mat layers of the preform and FIG. 3B shows a finished (reinforced) product.

DETAILED DESCRIPTION OF THE INVENTION

Figure 1:
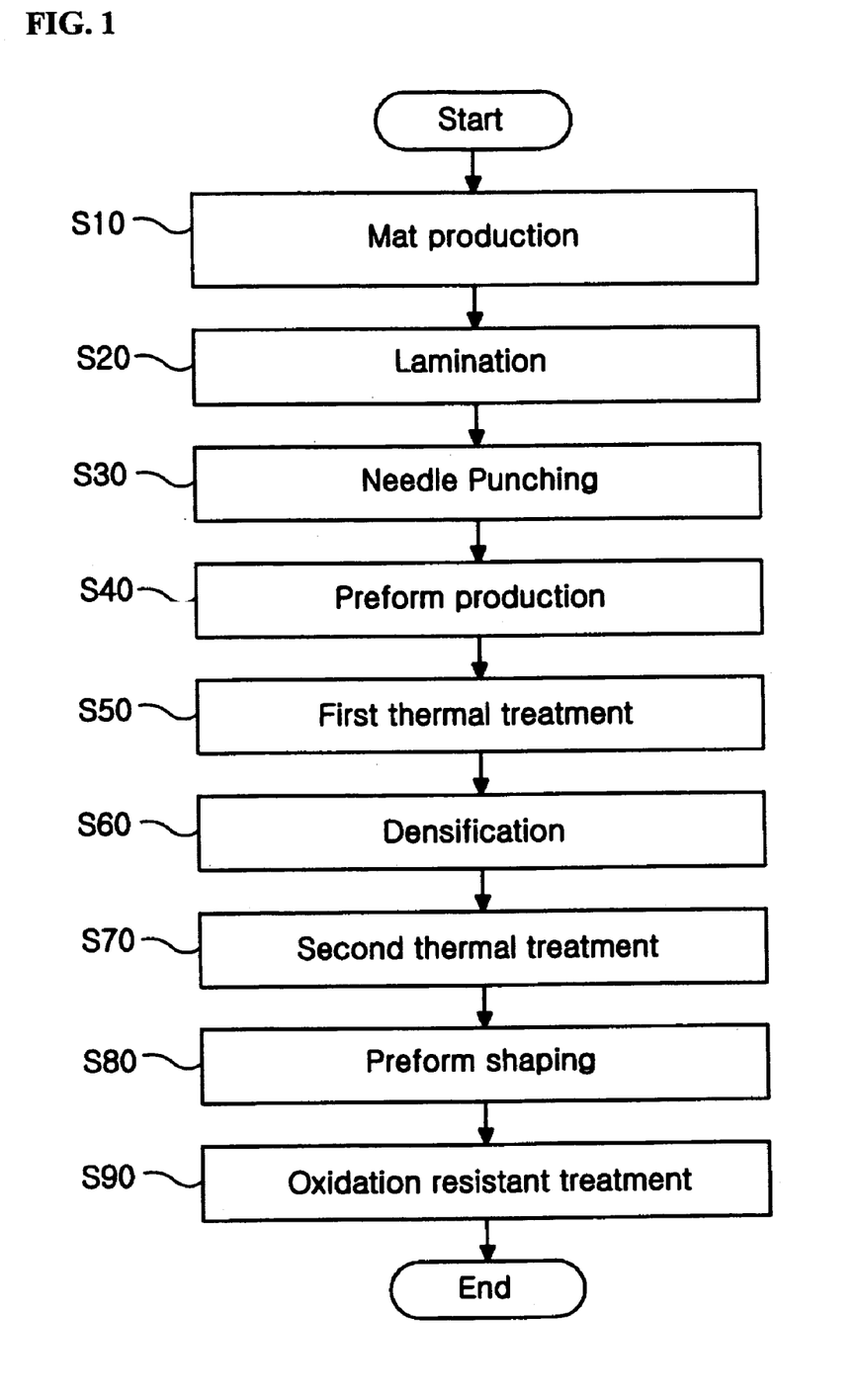
FIG. 1 is a process flow chart of a manufacturing method according to the present invention.

Referring to FIG. 1, a carbon-carbon composite material (e.g., a brake disk) is manufactured by a method according to the present invention.

In a step S10, a unidirectional mat is produced using carbon fiber, carbon fabric, or carbon sheet as the raw material. The carbon fiber is oxi-PAN or PAN fiber, wherein oxi-PAN is an oxidized fiber of PAN fiber. Preferably, 320K oxi-PAN is used in the present invention, with PAN fiber produced using 48K fiber. A plain or satin weave is used for the carbon fabric, and the carbon sheet is produced by impregnating resin (in the form of paper) with carbon fiber cut to a length of about 1~10 mm.

Using a mandrel, unidirectional mats are produced from oxi-PAN or PAN fiber. To prevent damage to the surface of the fiber, surface impregnation is performed over the entire surface of the fiber, using polyvinyl, epoxy, polyacetate, polyester, etc.

Figure 3A:
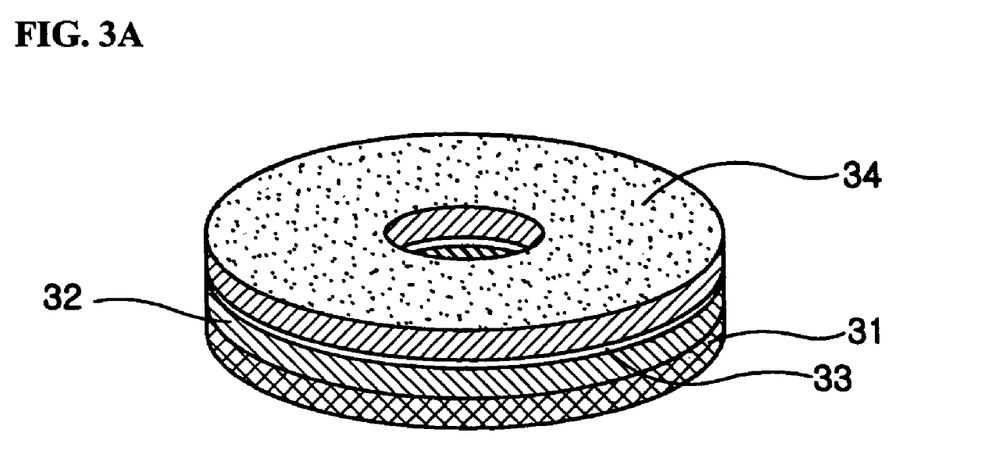

In a step S20, the carbon mats are laminated together after being produced individually, to produce a preform (shown in FIG. 3A) comprising mats 31, 32, and 33. The lamination is carried out in the order of 0°/−60°/+60°, wherein the mat 31 is 0°, the mat 32 is −60°, and the mat 33 is +60°. This sequence is used because an isotropic preform is essential to accommodate high thermal and/or mechanical loads applied at high temperature.

In a step S30, a needle punching process is performed on the laminated carbon mats 31, 32, and 33, to reinforce the mats in the z-axis. The structure of the fiber is reinforced by punching downward (with respect to the x-y plane) through the mat laminate. Upon withdrawal, the needle is restored without becoming entangled in the fiber during the feedback. Important variables during needle punching include needle shape, punching depth, and number of punches per unit area. The needle (shown in FIG. 2) has a number of barbs 23 protruding downwardly and further comprises a crank 21, a shank 22, and a point 24.

In a step S40, after the above lamination and needle punching, and after lamination of another mat 34, needle punching is again performed. By repeating these processes, a preform 36 having a z-axis reinforced fiber 35 is produced in the shape of a final product (shown in FIG. 3B).

As an alternative to the above method for producing the preform shown in the step S40, the preform is produced with the use of carbon fabric and staple fiber. Here, the preform can be produced by initially dispersing staple fiber on carbon fiber, laminating carbon fabric to acquire a predetermined thickness, and then employing a punching method. In this method, the staple fiber is reinforced in the z-axis using a needle, without damaging the carbon fiber.

In another alternative method, the preform is produced by alternately laminating carbon fabric and carbon sheet (paper), then employing a punching method. Here, the carbon sheet, including 1~10 mm carbon fiber, is reinforced in the z-axis. This method results in a uniform preform since the carbon sheet has a uniform distribution of carbon fiber.

When producing a preform using carbon fiber or carbon fabric, the volume ratio of carbon fiber is 25~30%; when producing a preform using oxi-PAN, the proper volume ratio is 45~50%. Higher volume ratios result in higher densification efficiency, to produce a high-density product, but the above volume ratio is preferred to avoid adverse effects such as non-uniform preforms.

Figure 3B:
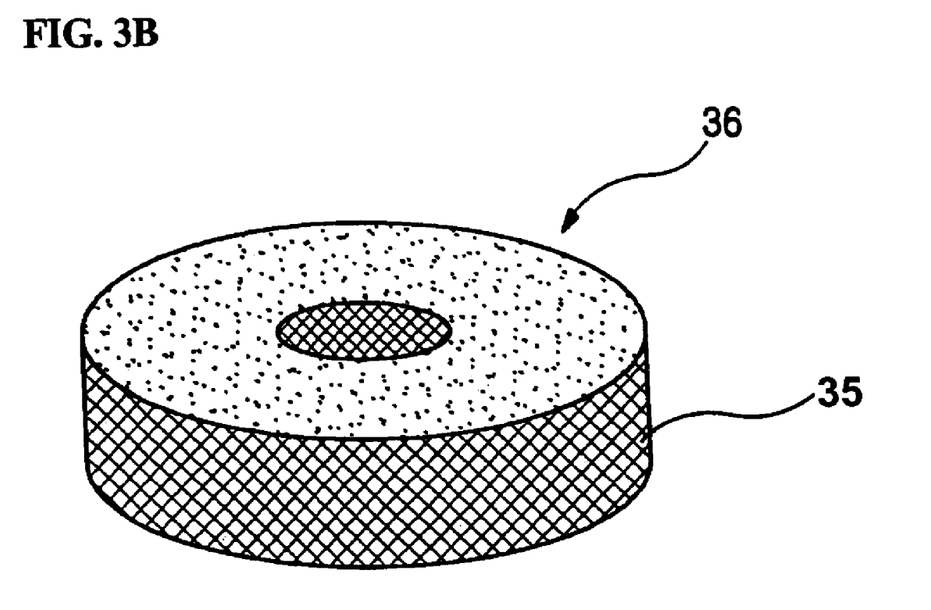

The proper thickness for one layer is suitable 0.1~2 mm. When one layer of a preform 36 is thicker than 1 mm, fiber composition on the x-y plane will be much larger than the x-z plane, thereby resulting in an anisotropy structure. In this case, partial cracking and other defects result upon generating a thermal load.

Figure 2:
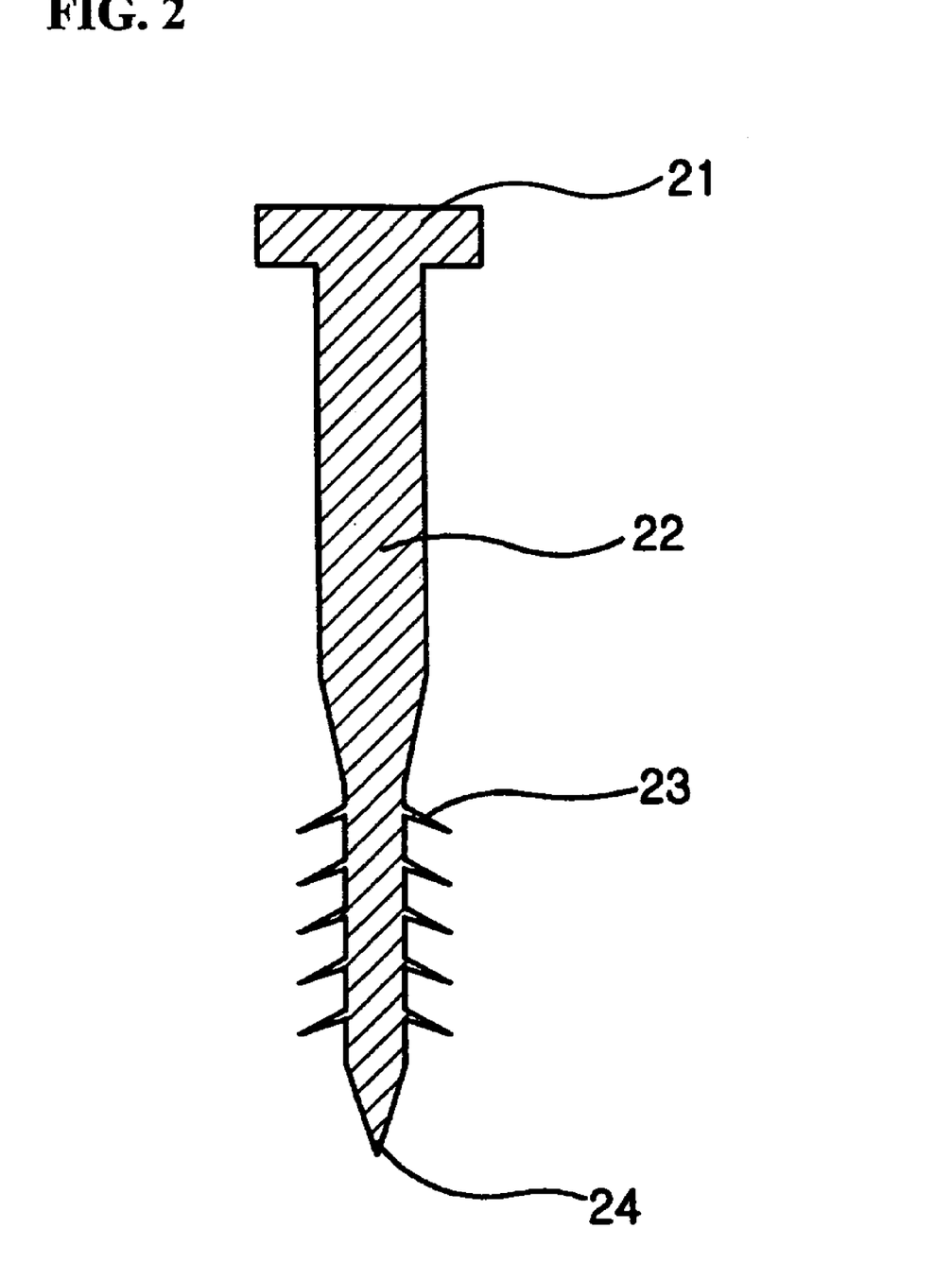
FIG. 2 is a cross section of a needle used in the present invention.

Also, the needle's angle during punching should be maintained within the range of 0~20°. With an angle larger than 20°, the mat or fabric can become entangled, which may result in defects in the preform 36.

The diameter of pores present in a preform 36 should be less than 700 μm. Larger diameters may result in a failure to increase density during the densification process.

The density of the preform 36 should be 0.4~1.0 g/cm$^3$. If the density is higher than 1.0 g/cm$^3$, the resulting increased thermal conductivity will hinder densification.

In a step S50, a first thermal treatment process is performed within a temperature range of 700~2000° C., to remove non-carbon impurities from the preform. The preform contains resin, oxi-PAN, carbon sheet, etc. but includes foreign materials as well as carbon.

During the first thermal treatment process, it is important to maintain the rising rate of the temperature at less than 50° C. per hour, to avoid defects such as layer separation. The thermal treatment environment should be a vacuum, since the carbon preform is in a state of simple bonding with the z-axis fiber rather than a state of chemical bonding. The cooling rate of the process should be less than 50° C. per hour, and the preform temperature should be less than 20° C. when the preform is separated from the thermal conditioning device. If separated at a temperature higher than room ambient, the latent heat within the preform reacts with air and causes oxidation.

In a step S60, densification is performed on the first-thermal-treated preform. The densification process may incorporate a variety of densifying methods; that is, a thermal gradient chemical vapor infiltration process, a liquid impregnation using a pitch such as pitch, phenol, etc., or a combination of these two processes. The resulting density is above 1.6~1.90 g/cc. Densification performed with thermal gradient chemical vapor infiltration imparts high mechanical strength due to pyrolytic carbon, but results in lower thermal conductivity (less than 50 W/m.K on the x-y plane) and a lower friction coefficient (0.15~0.25) than in the liquid impregnation process.

For a method based on liquid impregnation, densification is achieved through a vacuum impregnation and atmospheric carbonation process. Here, the carbonation process is performed on the preform 36 to produce a product by impregnating resin such as pitch, phenol, etc. several times in a vacuous atmosphere (below atmospheric pressure) and within the range of 700~1,000° C. under an inactive atmosphere. The matrix of a carbon brake disk produced using such a densification method can be easily converted to a graphitized structure due to inherent properties of the liquid impregnation process, thereby imparting the final product with high thermal conductivity (above 50 W/m.K on the x-y plane) and a high friction coefficient (above 0.35).

Such methods, i.e., those based on thermal gradient chemical vapor infiltration and liquid impregnation, can achieve good friction coefficients according to the desired application, namely, high coefficients for surface vehicles and low coefficients for aircraft. For intermediate-range friction coefficients, however, the above two processes can be combined into a single densification process. For example, according to the third embodiment of the invention, the density of the preform is increased to 1.55~1.65 g/cm$^3$ using thermal gradient chemical vapor infiltration followed by liquid impregnation.

Thermal gradient chemical vapor infiltration is a process whereby a thermal gradient is formed on a preform 36 with a hot wire installed within the preform 36. Then, the temperature of the surface of the inside diameter of the preform is heated to 800~1200° C. Next, the preform is infiltrated with carbon, from the inside diameter to the outside diameter, by pyrolyzing hydrocarbon gas. Here, it is preferable that the reaction gas density be 10~100% and the reaction pressure be 10~1000 torr. The hot wire preferably includes a resistance material such as graphite and the outside diameter of the hot wire is preferably 0.2~0.5 mm less than the inside diameter of the preform 36.

In a step S70, a second thermal treatment is performed within the temperature range of 1500~2800° C., to thereby impart the preform with the proper frictional, thermal, and mechanical properties of a brake disk.

In a step S80, the preform is given a predetermined shape according to design. According to the embodiments of the present invention, and for illustrative purposes only, the shape is that of a brake disk.

In a step S90, oxidation resistant is coated on the shaped preform to improve durability and inhibit oxidation during use. The oxidation resistant coating process is provided to prevent the loss of certain physical properties, because carbon-carbon composites generally show reduction in physical properties due to an oxidation of carbon material into carbon monoxide or dioxide as a result of a reaction with oxygen or carbon dioxide in the air, particularly when exposed to temperatures above 500° C. Such oxidation is a particular concern in high-temperature environments and where temperature cycling or large temperature fluctuations may occur in environments including vapor, oxygen, and carbon dioxide.

An important issue in the application of structural carbon material is the inhibition of the oxidation of carbon. Heretofore, there have been three processes of oxidation resistant coating: a method to remove impurities and reduce oxidation-active sites by performing thermal treatment on carbon-carbon composites at high temperature, a method to reduce the oxidation rate using an oxidation inhibitor, sealant, etc., and a method to inhibit oxidation by forming a diffusion barrier on the surface.

Among the aforementioned methods to reduce the effects of oxidation, the method of thermal treatment is performed to remove the impurities within the carbon-carbon composites by transforming the impurities into a graphitized structure, thereby reducing the oxidation-active site in a high-temperature oxygen atmosphere and thus increasing oxidation resistance. This method, however, requires costly equipment for the high-temperature thermal treatment. Furthermore, a single step of thermal treatment often fails to increases oxidation resistance at temperatures above 1000° C.

On the other hand, the method using an oxidation inhibitor, sealant, etc. is carried out by adding these materials to the raw materials when producing carbon-carbon composites. This method, however, requires a complicated manufacturing process and may unduly alter the physical and chemical composition of the end product.

Meanwhile, the third method, that of forming an oxidation diffusion barrier on the surface, coats the surface with a highly effective oxidation resistant material using chemical vapor infiltration or pack cementation with silicon-based materials. This method, too, has disadvantages, such as difficulty in use at high temperature due to chemical heterology between the carbon-carbon composites and the silicon-based materials Accordingly, the present invention can simplify the process by using boron chemical compounds, which are physically similar to carbon in terms of chemical and physical properties, while preventing transformation at high temperature, the creation of thermal cracks, and other defects. In doing so, a simple thermal treatment, i.e., under 1000° C., simplifies the entire process and reduces costs accordingly.

According to the present invention, the oxidation resistant material of carbon-carbon composites is composed of a chemical compound including boron as a method of forming an oxidation resistant layer on the surface, wherein the chemical compound is composed of B, BN, $H_3PO_4$, $Mn(H_3PO_4)_2 2H_2O$, KOH, $SiO_2$, and $NH_3$, and the carbon-carbon composites can be produced by an oxidation resistant coating process using the compound.

The First Embodiment of the Invention

Winding 320K oxi-PAN fiber on a mandrel produces a unidirectional carbon mat, and multiple such mats are produced and laminated. The lamination is carried out using an alternating method of 0°/−60°/+60°. After laminating at least two layers, each layer is reinforced in the z-axis by punching with a needle. Repeating the above process produces a preform 30 mm thick.

The preform is produced with the oxi-PAN fiber volume ratio of about 45%, the thickness of one layer about 0.9 mm, and the z-axis fiber ratio is about 10%.

To remove the impurities of the preform, thermal treatment is performed in a vacuum atmosphere at 1700° C. To reach this temperature, the heat is increased at a rate of 10° C. per hour under nitrogen atmosphere. Upon cooling, the cooling rate is 20° C. per hour to reach a room ambient temperature, 24 hours after which, the thermally treated preform is separated from the equipment for inhibiting oxidation of the preform. At this point, the volume contraction rate of the preform is 20% and its weight reduction rate is 40%.

Subsequently, using a thermal gradient chemical vapor infiltration process, densification is performed on the thermally treated preform. Here, the thermal gradient chemical vapor infiltration is performed by chemical equipment capable of completely exhausting gases present inside the reactor using a vacuum pump and then filling pores of the preform 36 with a pyrolytic carbon by filling the reactor with propane. In this case, the reactor pressure during the process is set to maintain a vacuum, and a condenser is operating to remove the resin generated from the process.

The preform is placed adjacent a hot-wire (graphite cylinder) capable of heating. Then, the hot wire including a preform is placed at the center portion of the top and bottom electrodes, wherein an insulating material is placed into the gap between each preform to densify multiple preforms, thereby separating each preform.

Moreover, a thermometer is inserted into a hole formed on the insulating material in order to measure the temperature difference in the direction of circumference, and the hot wire including a preform is installed in the reactor. Then, a vacuum, i.e., under 50 torr, is held in the reactor using a vacuum pump.

An inactive atmosphere is maintained in the reactor by supplying the reactor with nitrogen gas continuously, wherein the flow rate of the nitrogen gas is 50~150 slm.

Subsequently, the eutectic temperature is set within the range of 950~1000° C. on the contact area of a preform and a hot wire by supplying the current to the +/− electrodes. After reaching the specified temperature, the reactor is filled with propane gas. To perform the process, the propane gas has a degree of purity above 95% and its flow rate is 80~150 slm.

At this point, the internal pressure is held within the range of 300~2000 torr, and infiltration is performed from the inside to the outside surface of the preform using propane gas.

Following the above process, thermal treatment is performed after separating the preform from the hot wire, wherein the thermal treatment is performed under an argon atmosphere at 2000° C., and the heat rising rate is approximately 40° C. per hour. Following the thermal treatment, a shape forming process is performed. Finally, an oxidation resistant process is performed.

In the oxidation resistant treatment, coating is performed using a chemical compound composed of B, BN, $H_3PO_4$, $Mn(H_3PO_4)_2 2H_2O$, KOH, $SiO_2$, and $NH_3$, and curing and a thermal treatment are performed at 300° C. and 900° C., respectively.

The Second Embodiment of the Invention

Winding PAN fibers on a mandrel produces a unidirectional carbon mat. Here, 48K PAN fiber is used for the PAN fiber.

The preform is produced with the PAN fiber volume ratio of about 25%, the thickness of one layer is about 1.0 mm, and the z-axis fiber ratio is about 10%.

The carbon mats produced with the above method are laminated alternately with a method of 0°/−60°/+60°. After laminating at least two layers, each layer is reinforced with the z-axis by punching with a needle. Repeating the above process produces a preform 30 mm thick.

As in the first embodiment, a thermal gradient chemical vapor infiltration process is performed on the preform.

Following the thermal gradient chemical vapor infiltration process, thermal treatment is performed after separating the preform from the hot-wire, wherein the thermal treatment is performed under an argon atmosphere at 2000° C., and the heat rising rate is approximately 40° C. per hour.

Following the thermal treatment, a shape forming process is performed, and finally, an oxidation resistant process is performed.

As an oxidation resistant coating liquid, a chemical compound composed of B, BN, $H_3PO_4$, $Mn(H_3PO_4)_2 2H_2O$, KOH, $SiO_2$, and $NH_3$ is used. Then, curing and a thermal treatment are performed at 300° C. and 900° C., respectively.

The Third Embodiment of the Invention

Winding PAN fibers on a mandrel produces a unidirectional carbon mat, wherein 48K PAN fiber is used for the PAN fiber.

The preform is produced with the PAN fiber volume ratio of about 25%, the thickness of one layer is about 1.0 mm, and the z-axis fiber ratio is about 10%.

The carbon mats produced with the above method are laminated alternately with a method of 0°/−60°/+60°. After laminating at least two layers, each layer is reinforced with the z-axis by punching with a needle. Repeating the above process produces a preform 30 mm thick.

As in the first embodiment, a thermal gradient chemical vapor infiltration process is performed on the above preform to increase the density to 1.60 g/cm³.

Next, the above product is charged with an impregnation reactor to perform vacuum impregnation carbonization. The impregnation reactor is set up with an inactive atmosphere using nitrogen for vacuum impregnation, and the above product is impregnated at approximately 300~350° C. using a pitch. Subsequently, a carbonization is performed at 1000° C.

Following the thermal treatment, a shape forming process is performed, and finally, an oxidation resistant process is performed. For an oxidation resistant coating liquid, a chemical compound composed of B, BN, $H_3PO_4$, $Mn(H_3PO_4)_2 2H_2O$, KOH, $SiO_2$, and $NH_3$ is used for coating; then, curing and a thermal treatment are performed at 300° C. and 900° C., respectively.

The Fourth Embodiment of the Invention

Using a method of dispersing staple fiber in carbon fiber, and then again laminating carbon fabric on the carbon fiber, the above two materials are laminated alternately continuously.

The staple fiber having a length of 1~10 mm is used. The fabrics are laminated alternately with a method of 0°/−60°/+60°.

After laminating at least two layers, each layer is reinforced with the z-axis by punching with a needle, and repeating the above process produces a preform 30 mm thick.

The preform is produced with the oxi-PAN fiber volume ratio of about 30%, a one-layer thickness of about 1.0 mm, and a z-axis fiber ratio of about 12%.

As in the first embodiment, a thermal gradient chemical vapor infiltration process is performed on the preform to increase the density to 1.70 g/cm³.

The thermal treatment is performed at 2000° C. Following the thermal treatment, a shape forming process is performed, and finally, an oxidation resistant process is performed. For an oxidation resistant coating liquid, a coating is performed with a chemical compound composed of B, BN, $H_3PO_4$, $Mn(H_3PO_4)_2 2H_2O$, KOH, $SiO_2$, and $NH_3$; then, curing and a thermal treatment is performed at 300° C. and 900° C., respectively.

For the carbon-carbon composite brake disk, produced with each method according to the four embodiments as mentioned above, the values of density, thermal conductivity, compression strength, shear strength, and friction coefficient are shown in Table 1.

TABLE 1

| Embodiment | Density (g/cm³) | Thermal Conductivity (W/m.K) | Compression Strength (mpa) | Shear Strength (mpa) | Friction Coefficient |
| --- | --- | --- | --- | --- | --- |
| 1 | 1.74 | 30 | 160 | 17 | 0.17 |
| 2 | 1.76 | 28 | 155 | 15 | 0.20 |
| 3 | 1.73 | 60 | 150 | 14 | 0.30 |
| 4 | 1.77 | 55 | 180 | 19 | 0.25 |

As shown in Table 1, carbon-carbon composite brake disk produced according to the first embodiment has high compression and shear strength with low friction coefficient, thereby providing an excellent performance as a brake disk for civil aircraft requiring low friction coefficient and high load.

A carbon brake disk produced according to the second embodiment exhibits physical properties similar to those of the first embodiment and has advantages such as process simplification and cost reduction.

The third embodiment produces a carbon brake disk that can withstand thermal and mechanical loads at high temperature, due to high compression and shear strength together with a high friction coefficient.

A carbon-carbon composite brake disk produced according to the fourth embodiment has excellent compression and shear strength. Furthermore, such a brake disk has the combined advantages of the above three processes and has an advantage in that friction coefficient is controllable as a result of combining the processes of the first, second, and third embodiments.

As demonstrated above, by an effective method for manufacturing carbon-carbon composites for frictional materials, a carbon-carbon composite brake disk has excellent mechanical and thermal properties and is durable under high loads at high temperatures (above 500° C.).

Though the preferred embodiments according to the present invention are described above in detail, it is apparent to those skilled in the art to which this invention pertains that various modifications and variations can be made in the present invention in the spirit of and within the scope of the invention; therefore the scope of technical protection of the invention should be judged by the scope of the appended claims.

What is claimed is:

1. A method for manufacturing carbon-carbon composites, comprising steps of:
producing a mat selected from the group consisting of carbon fiber, carbon fabric, carbon sheet, and staple fiber;
laminating at least three layers of said mat;
producing a preform using laminated said mat with a needle punching method;
performing a first thermal treatment process on the produced preform at a predetermined temperature;
densifying the first-thermal-treated preform by a thermal gradient chemical vapor infiltration process and then by a liquid impregnation process to form a densified preform such that its density is increased to 1.55–1.65 g/cm$^3$ by the thermal gradient chemical vapor infiltration process and then is increased to 1.60–1.90 g/cm$^3$ by the liquid impregnation process;
performing a second thermal treatment process on the densified preform;
forming a predetermined shape out of the second thermal treated preform; and
performing an oxidation resistant treatment process on the shaped preform.

2. The method for manufacturing carbon-carbon composites as claimed in claim 1, wherein the predetermined temperature of the first thermal treatment process is 700~2000° C.

3. The method for manufacturing carbon-carbon composites as claimed in claim 1, wherein said carbon fiber is one selected from the group consisting of oxi-PAN-based fiber, PAN-based fiber, rayon-based fiber, and pitch-based fiber.

4. The method for manufacturing carbon-carbon composites as claimed in claim 1, wherein the oxidation-resistant-treated preform has a carbon fiber volume ratio of 10~40%.

5. The method for manufacturing carbon-carbon composites as claimed in claim 1, wherein the thickness of said mat is 0.1~2.0 mm.

6. The method for manufacturing carbon-carbon composites as claimed in claim 1, wherein the carbon fiber reinforced with a z-axis has a length of 1~10 mm.

7. The method for manufacturing carbon-carbon composites as claimed in claim 1, wherein the mat lamination is semi-isotropic.

8. The method for manufacturing carbon-carbon composites as claimed in claim 1, wherein said second thermal treatment process is performed at a temperature of 1500~2800° C.

9. The method for manufacturing carbon-carbon composites as claimed in claim 1, wherein the oxidation resistant treatment process comprises a coating step performed using a chemical composition mixed with B, BN, $H_3PO_4$, $Mn(H_3PO_4)22H_2O$, KOH, $SiO_2$, and $NH_3$.

10. The method for manufacturing carbon-carbon composites of claim 1, wherein said oxidation resistant treatment is cured and thermal-treated within the range of 200~1200° C.

* * * * *